United States Patent
Kim et al.

(10) Patent No.: US 11,271,284 B2
(45) Date of Patent: Mar. 8, 2022

(54) ELECTRONIC DEVICE COMPRISING AT LEAST ONE SWITCH FOR SUPPLYING ELECTRICITY TO LOOP ANTENNA

(71) Applicant: Samsung Electronics Co., Ltd., Gyeonggi-do (KR)

(72) Inventors: Yu Su Kim, Gyeonggi-do (KR); Ju Hyang Lee, Gyeonggi-do (KR); Kyung Min Park, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/761,696

(22) PCT Filed: Oct. 22, 2018

(86) PCT No.: PCT/KR2018/012495
§ 371 (c)(1),
(2) Date: May 5, 2020

(87) PCT Pub. No.: WO2019/098548
PCT Pub. Date: May 23, 2019

(65) Prior Publication Data
US 2021/0184336 A1    Jun. 17, 2021

(30) Foreign Application Priority Data

Nov. 15, 2017  (KR) .................. 10-2017-0151970

(51) Int. Cl.
*H01Q 1/24*      (2006.01)
*G06Q 20/14*    (2012.01)
(Continued)

(52) U.S. Cl.
CPC .............. *H01Q 1/24* (2013.01); *G06Q 20/14* (2013.01); *H01Q 7/00* (2013.01); *H05K 1/0243* (2013.01);
(Continued)

(58) Field of Classification Search
CPC ............ H01Q 1/24; H01Q 7/00; H01Q 1/243; H01Q 1/38; G06Q 20/14; G06Q 20/145;
(Continued)

(56) References Cited

U.S. PATENT DOCUMENTS

| | | |
|---|---|---|
| 7,424,308 B2 | 9/2008 | Suzuki |
| 10,320,067 B2 | 6/2019 | Jeon |

(Continued)

FOREIGN PATENT DOCUMENTS

| | | |
|---|---|---|
| KR | 200154249 | 5/1999 |
| KR | 100733205 | 6/2007 |

(Continued)

OTHER PUBLICATIONS

PCT/ISA/210 Search Report issued on PCT/KR2018/012495, pp. 5.
PCT/ISA/237 Written Opinion issued on PCT/KR2018/012495, pp. 7.

*Primary Examiner* — Seung H Lee
(74) *Attorney, Agent, or Firm* — The Farrell Law Firm, P.C.

(57) ABSTRACT

An electronic device according to an embodiment of the disclosure may include a loop antenna, a printed circuit board including a power wire and a ground wire, a first switch electrically connected between a first terminal of the loop antenna and the power wire, a second switch electrically connected between the first terminal and the ground wire, a third switch electrically connected between a second terminal of the loop antenna and the power wire, a fourth switch electrically connected between the second terminal and the ground wire, and a controller.

15 Claims, 9 Drawing Sheets

(51) Int. Cl.
  *H01Q 7/00* (2006.01)
  *H05K 1/02* (2006.01)
(52) U.S. Cl.
  CPC .............. *H05K 2201/10037* (2013.01); *H05K 2201/10053* (2013.01); *H05K 2201/10098* (2013.01)
(58) Field of Classification Search
  CPC ....... H05K 1/0243; H05K 2201/10037; H05K 2201/10053; H05K 2201/10098; H05K 2201/10015; G07F 15/006; H04B 5/0081; H04B 5/02; H04B 5/0037
  See application file for complete search history.

(56) References Cited

U.S. PATENT DOCUMENTS

| | | | |
|---|---|---|---|
| 10,516,285 B2 * | 12/2019 | Pawar | H02J 7/025 |
| 2016/0056545 A1 | 2/2016 | Park et al. | |
| 2016/0149416 A1 * | 5/2016 | Ha | H02J 7/00034 307/104 |
| 2017/0237149 A1 * | 8/2017 | Lee | G06K 7/00 361/679.21 |
| 2018/0123373 A1 * | 5/2018 | Lee | H02J 50/10 |

FOREIGN PATENT DOCUMENTS

| | | |
|---|---|---|
| KR | 101144379 | 5/2012 |
| KR | 1020170089219 | 8/2017 |
| KR | 1020170094748 | 8/2017 |

\* cited by examiner

ELECTRONIC DEVICE COMPRISING AT LEAST ONE SWITCH FOR SUPPLYING ELECTRICITY TO LOOP ANTENNA

PRIORITY

This application is a National Phase Entry of PCT International Application No. PCT/KR2018/012495 which was filed on Oct. 22, 2018, and claims priority to Korean Patent Application No. 10-2017-0151970, which was filed on Nov. 15, 2017, the content of each of which is incorporated herein by reference.

TECHNICAL FIELD

Embodiments of the disclosure relate to a technology for stably feeding a radiator.

BACKGROUND ART

As mobile communication technologies develop, an electronic device, which is equipped with a radiator, such as a smartphone, a wearable device, or the like is being widely supplied. The electronic device may feed a radiator (e.g., a magnetic secure transmission (MST) coil) and may be paired with an external device (e.g., a payment terminal). The electronic device paired with the external device may make a payment or may transmit/receive various kinds of data to/from the external device.

DISCLOSURE

Technical Problem

While an electronic device is powered by a battery to supply a current to a radiator, a current may flow backward to the battery. The current flowing backward may make a voltage level between the battery and the radiator unstable. The unstable voltage level may make it difficult for the battery to feed the radiator stably.

Also, the electronic device may include a capacitive element (e.g., a capacitor) for the purpose of stabilizing a voltage level between the battery and the radiator. However, the capacitive element may make a volume of the electronic device large and may increase the costs of manufacturing the electronic device.

Embodiments of the disclosure provide an electronic device for solving the above-described problem and problems brought up in this specification.

Technical Solution

An electronic device according to an embodiment of the disclosure may include a loop antenna, a printed circuit board including a power wire and a ground wire, a first switch electrically connected between a first terminal of the loop antenna and the power wire, a second switch electrically connected between the first terminal and the ground wire, a third switch electrically connected between a second terminal of the loop antenna and the power wire, a fourth switch electrically connected between the second terminal and the ground wire, and a controller, wherein the controller is configured to electrically connect the power wire and the first terminal through the first switch and electrically connect the ground wire and the second terminal through the fourth switch, such that a power is supplied to the loop antenna, to turn off the first switch electrically connected between the power wire and the first terminal and connect the first terminal and the ground wire through the second switch, with the fourth switch turned on, such that at least a portion of the supplied power to the loop antenna is discharged, and to turn off the fourth switch electrically connected between the second terminal and the ground wire and electrically connect the power wire and the second terminal through the third switch, with the second switch turned on, such that a power is supplied to the loop antenna.

An electronic device according to an embodiment of the disclosure may include a loop antenna, a printed circuit board including a power wire and a ground wire, a first switch electrically connected between a first terminal of the loop antenna and the power wire, a second switch electrically connected between the first terminal and the ground wire, a third switch electrically connected between a second terminal of the loop antenna and the power wire, a fourth switch electrically connected between the second terminal and the ground wire, a controller electrically connected with each of the first switch, the second switch, the third switch, and the fourth switch, and a processor electrically connected with the controller, the processor may transmit, to the controller, a signal for controlling the controller in response to a user input for making a payment, and based on the signal, the controller may be configured to electrically connect the power wire and the first terminal through the first switch and electrically connect the second terminal and the ground wire through the fourth switch, to turn off the first switch electrically connected between the power wire and the first terminal and connect the first terminal and the ground wire through the second switch, with the fourth switch turned on, and to turn off the fourth switch electrically connected between the second terminal and the ground wire and electrically connect the power wire and the second terminal through the third switch, with the second switch turned on.

An electronic device according to an embodiment of the disclosure may include a loop antenna, a printed circuit board including a power wire and a ground wire, a first switch electrically connected between a first terminal of the loop antenna and the power wire, a second switch electrically connected between the first terminal and the ground wire, a third switch electrically connected between a second terminal of the loop antenna and the power wire, a fourth switch electrically connected between the second terminal and the ground wire, and a controller electrically connected with the first switch, the second switch, the third switch, and the fourth switch, and the controller is configured to supply a power in a first direction to the loop antenna based on a first electrical path formed by the first switch and the fourth switch, when a specified condition is satisfied, to discharge the power in the first direction based on a second electrical path formed by the second switch and the fourth switch, and to supply a power in a second direction to the loop antenna based on a third electrical path formed by the third switch and the second switch.

Advantageous Effects

According to embodiments of the disclosure, a power supply system may be stabilized. Also, according to embodiments of the present disclosure, a volume and manufacturing costs of an electronic device may decrease.

Besides, a variety of effects directly or indirectly understood through this disclosure may be provided.

MODE FOR INVENTION

Figure 1:
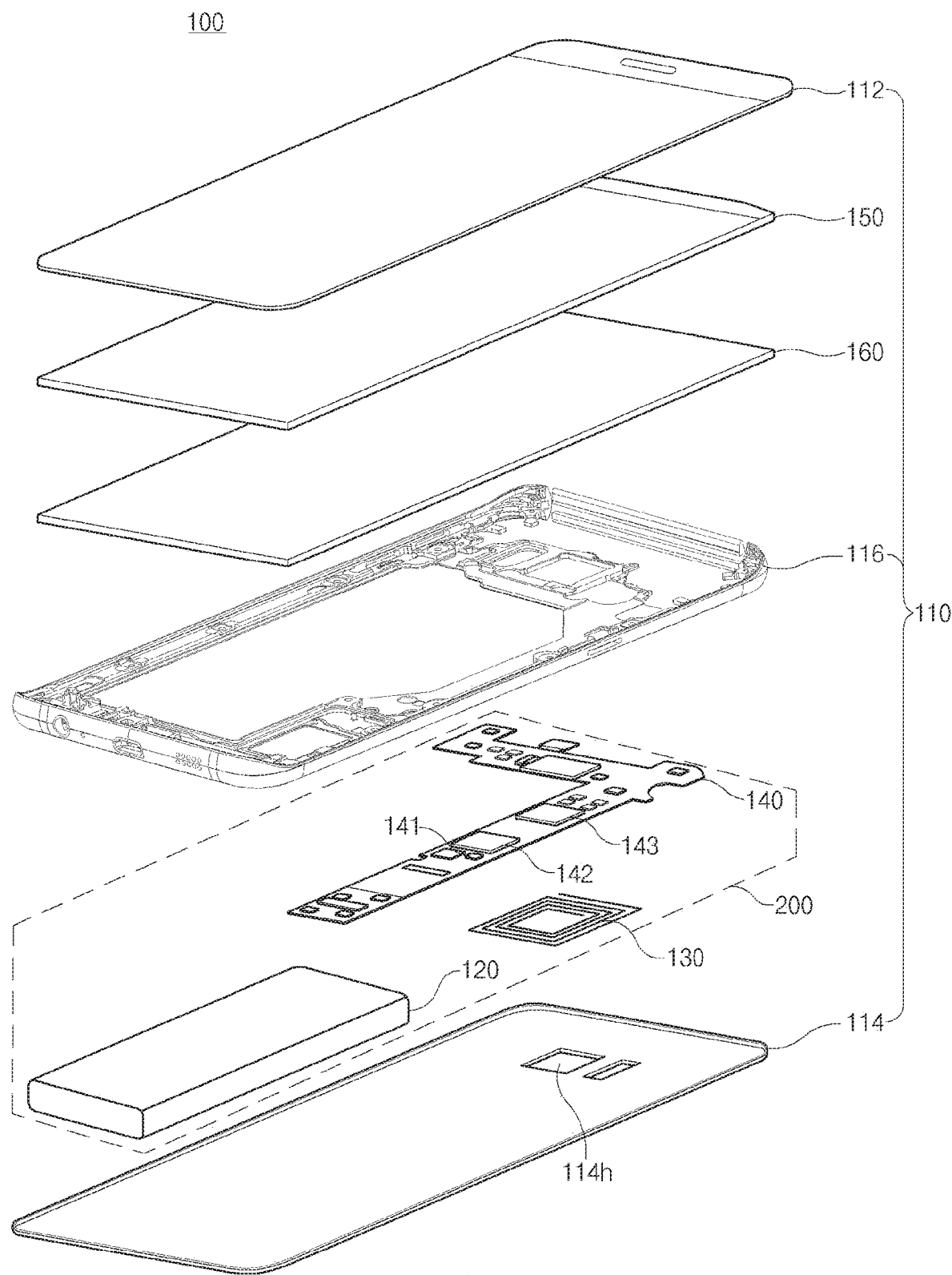
FIG. 1 is an exploded perspective view of an electronic device according to an embodiment.

FIG. 1 is an exploded perspective view of an electronic device according to an embodiment.

Referring to FIG. 1, an electronic device 100 may include a housing 110, a battery 120, a radiator 130, a printed circuit board 140, a display 150, and a shielding layer 160.

The housing 110 may form the exterior of the electronic device 100. For example, the housing 110 may include a cover glass 112, a back cover 114, and a side housing 116.

The cover glass 112 may transmit a light generated by the display 150. Also, a user may touch a portion (e.g., a finger) of his/her body on the cover glass 112 to perform a touch (including a contact using an electronic pen). For example, the cover glass 112 may be formed of tempered glass, reinforced plastic, a flexible polymer material, or the like. According to an embodiment, the cover glass 112 may be also referred to as a "glass window".

The side housing 116 may protect the components included in the electronic device 100. For example, the display 150, the printed circuit board 140, the battery 120, and the like may be accommodated within the side housing 116, and the side housing 116 may protect the components from an external shock.

The side housing 116 may include an area that is not exposed to the outside of the electronic device 100 and an area that is exposed to the outside of the electronic device 100. For example, the area that is not exposed to the outside of the electronic device 100 may be formed of a non-conductive material. The area that is exposed to the outside of the electronic device 100 may be formed of metal. The exposed area that is formed of a metal material may be also referred to as a "metal bezel". According to an embodiment, at least a portion of the metal bezel may be utilized as an antenna radiator for transmitting/receiving a signal in a specified frequency band.

The back cover 114 may be coupled to a back surface of the electronic device 100 (i.e., a bottom of the side housing 116). The back cover 114 may be formed of tempered glass, plastic, and/or metal. According to an embodiment, the back cover 114 may be integrally implemented with the side housing 116 or may be implemented to be removable by the user.

Although not illustrated in FIG. 1, the electronic device 100 may include a camera module (not illustrated). The camera module may be exposed through an opening 114h formed at the back cover 114.

The battery 120 may convert chemical energy and electrical energy bidirectionally. For example, the battery 120 may convert chemical energy into electrical energy and may supply the converted electrical energy to the display 150 and various components or modules mounted on the printed circuit board 140. Alternatively, the battery 120 may convert and store electrical energy supplied from the outside into chemical energy. According to an embodiment, a power management module for managing the charging/discharging of the battery 120 may be included in the printed circuit board 140.

The radiator 130 may be interposed between the printed circuit board 140 and the back cover 114. Also, the radiator 130 may correspond to a coil-type radiator that is in the shape of surrounding the opening 114h formed at the back cover 114 when viewed from the printed circuit board 140.

The radiator 130 may transmit/receive a signal in a specified frequency band. For example, the radiator 130 may transmit/receive a signal in a 13.56 MHz frequency band and may make a payment (e.g., a purchase and sale payment). For another example, the radiator 130 may transmit/receive a signal in a 6.78 MHz frequency band to charge the battery 120. In the specification, the radiator 130 may be referred to as a "magnetic secure transmission (MST) coil", a "loop antenna", or the like.

The radiator 130 illustrated in FIG. 1 is exemplary, and claims according to embodiments of the disclosure are not limited to the radiator 130 illustrated in FIG. 1. For example, the electronic device 100 may transmit/receive a signal in a specified frequency band through a laser direct structuring (LDS) radiator.

Various electronic parts, elements, circuits, or the like of the electronic device 100 may be mounted on the printed circuit board 140. For example, a first capacitive element 141 (e.g., a capacitor), an integrated circuit 142 (e.g., a magnetic secure transmission (MST) IC), at least one processor 143 (e.g., an application processor (AP) and/or a communication processor (CP)), a memory, or the like may be mounted on the printed circuit board 140. In the specification, the printed circuit board 140 may be referred to as a "main board" or a "printed board assembly (PBA)".

According to an embodiment, the printed circuit board 140 may include a plurality of layers. For example, the printed circuit board 140 may include a non-conductive layer formed of a non-conductive material (e.g., plastic) and a conductive layer formed of a conductive material (e.g., copper or graphite). The conductive layer may operate as a ground layer (e.g., 140g of FIG. 2) (referenced to as a "ground part", a "ground wire", or the like) of the integrated circuit 142.

According to an embodiment, the battery 120, the first capacitive element 141, the integrated circuit 142, and the radiator 130 may be electrically connected. For example, the battery 120 and the first capacitive element 141 may be connected with one end of the integrated circuit 142 (hereinafter, an integrated circuit input terminal (e.g., 142i of FIG. 2) or an input terminal), and the radiator 130 may be connected with an opposite end of the integrated circuit 142. The first capacitive element 141 may uniformly maintain a voltage of the integrated circuit input terminal 142i. In the specification, the first capacitive element 141 may be referred to as a "tantal capacitor". In the specification, a wire through which the battery 120 is connected with the integrated circuit 142 may be referred to as a "power wire" or the like.

The integrated circuit 142 may receive an electrical energy from the battery 120 and may feed the radiator 130. The integrated circuit 142 may transmit/receive a signal in a specified frequency band, based on an electrical path formed through the radiator 130. In the specification, the "feeding" may mean an operation in which the integrated circuit 142 applies a current to the radiator 130.

According to an embodiment, the integrated circuit 142 may be connected with the ground layer (e.g., 140g of FIG. 2) of the printed circuit board 140. The integrated circuit 142 may make a free wheeling current to flow through the ground layer 140g in the process of applying a current to the radiator 130. In the specification, the free wheeling current may mean a current flowing backward from the integrated circuit 142 to the battery 120. As the integrated circuit 142 according to an embodiment of the disclosure allows a free wheeling current to flow through the ground layer 140g, the amount of free wheeling current flowing backward to the battery 120 may decrease. As such, the battery 120 may stably supply a voltage to the integrated circuit 142. Also, as the amount of free wheeling current decreases, it may be possible to reduce a capacity (and/or the number) of the first capacitive element 141 for maintaining a voltage of the integrated circuit input terminal 142i.

When a specified condition is satisfied, the at least one processor 143 may perform a specific operation by allowing the integrated circuit 142 to feed the radiator 130. For example, in the case where the user wants to make a payment through the electronic device 100, the processor 143 may transmit/receive a signal in a specified frequency band by allowing the integrated circuit 142 to feed the radiator 130. In another embodiment, in the case where the user wants to wirelessly charge the battery 120, the processor 143 may receive a power through the radiator 130 and may charge the battery 150.

The display 150 may be disposed under the cover glass 112. The display 150 may be electrically connected with the printed circuit board 140, and may output content (e.g., a text, an image, a video, an icon, a widget, a symbol, or the like) or may receive a touch input (e.g., a touch, a gesture, a hovering, or the like) from the user.

The shielding layer 160 may be interposed between the display 150 and the side housing 116. The shielding layer 160 may shield an electro-magnetic wave generated between the display 150 and the printed circuit board 140 to prevent an electro-magnetic interference between the display 150 and the printed circuit board 140.

According to an embodiment, the shielding layer 160 may include a thin film sheet or a plate, which is formed of copper (Cu) or graphite. In the case where the shielding layer 160 is formed of copper (Cu) or graphite, components included in the electronic device 100 may be grounded to the shielding layer 160.

In the specification, the description given with reference to FIG. 1 may be identically applied to components having the same reference numerals/marks as the components of the electronic device 100 described with reference to FIG. 1.

Figure 2A:
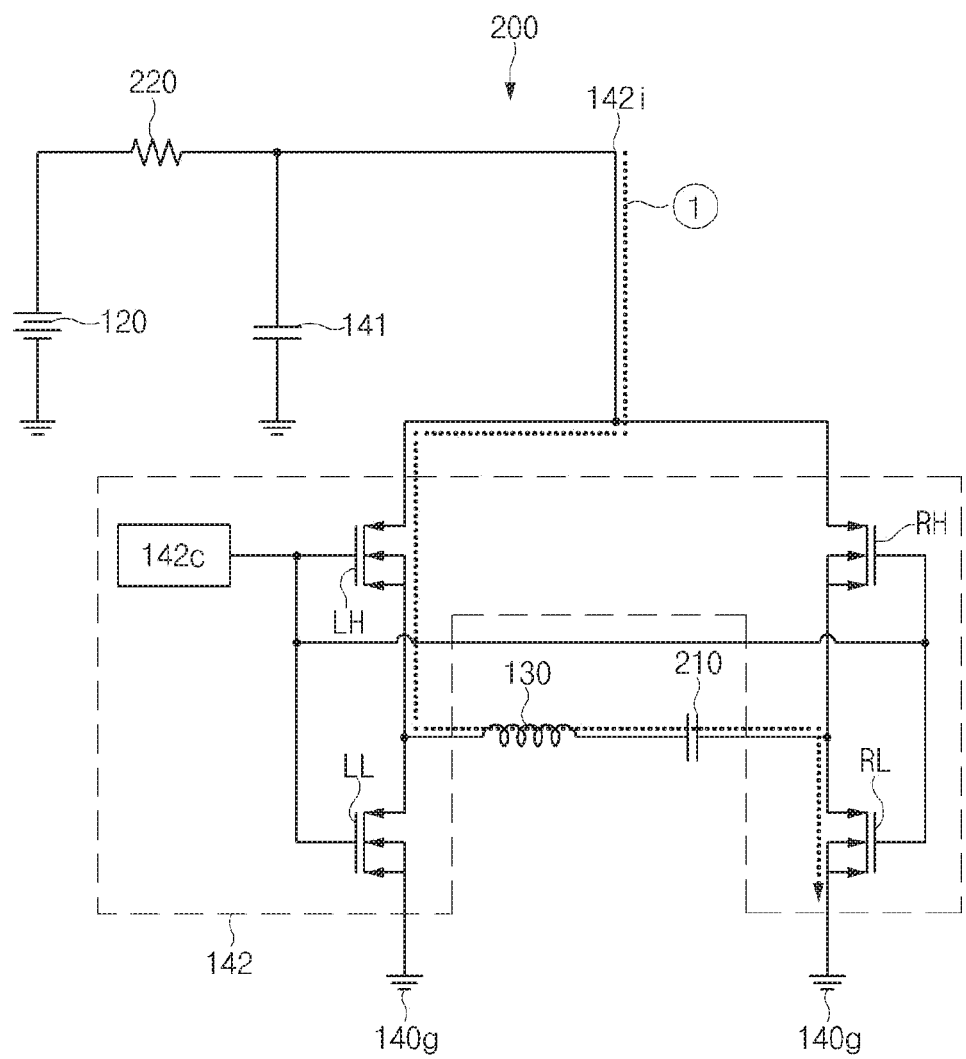
FIG. 2A illustrates a circuit diagram of a part of an electronic device according to an embodiment.
Figure 2B:
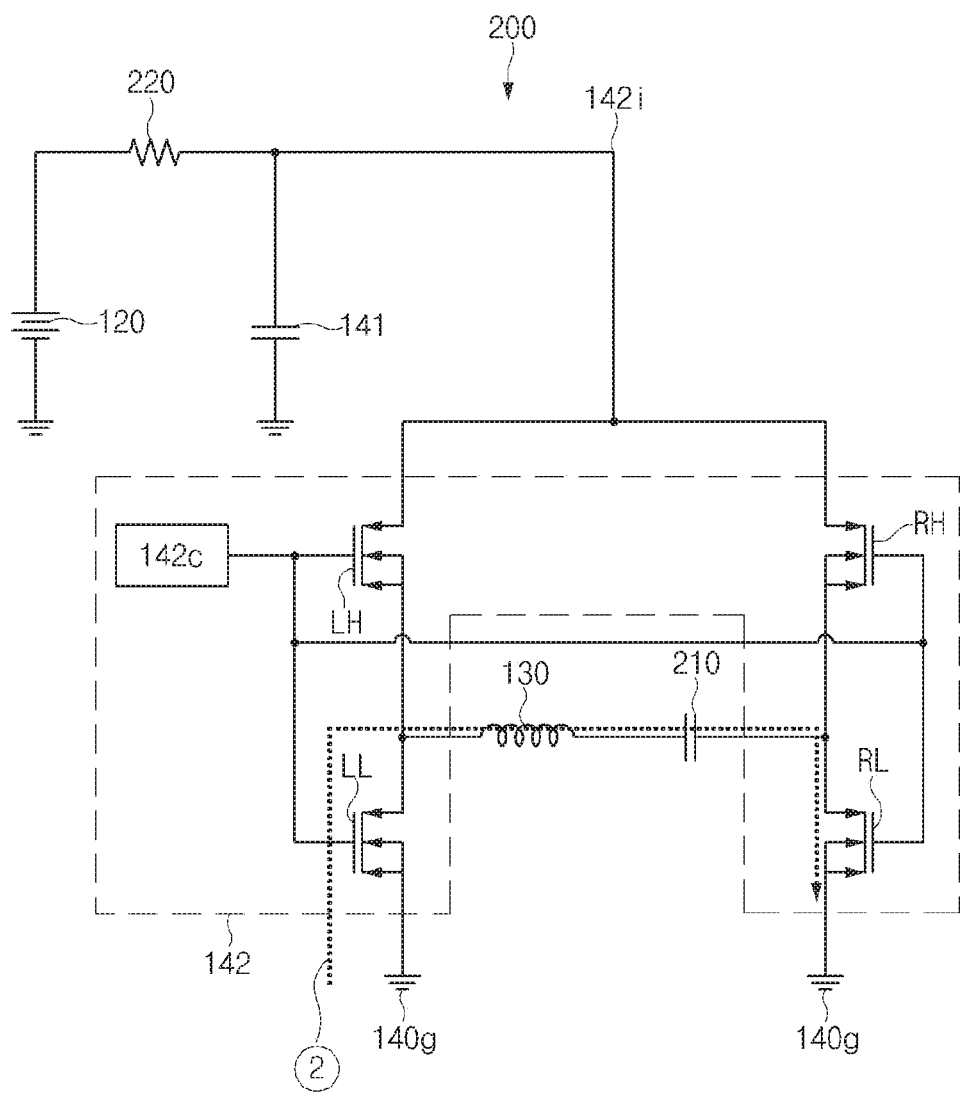
FIG. 2B illustrates a circuit diagram of a part of an electronic device according to another embodiment.
Figure 2C:
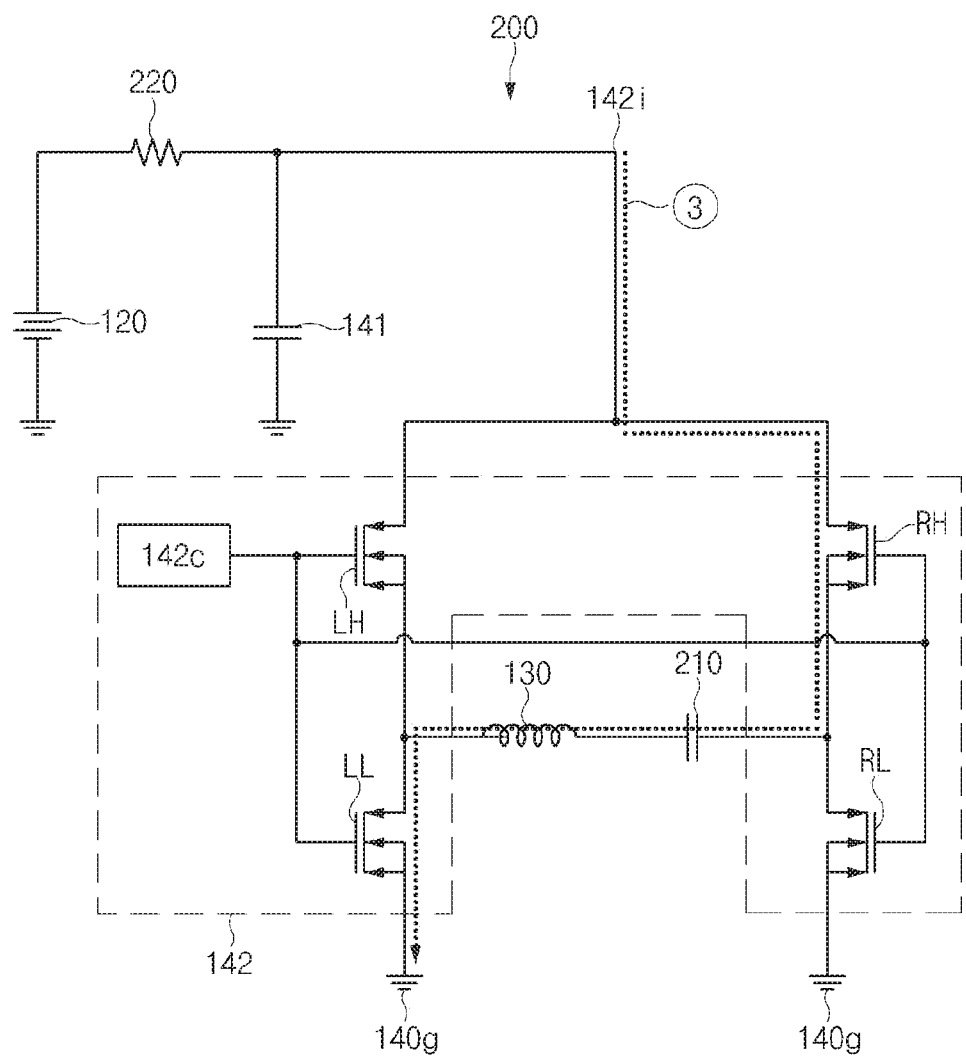
FIG. 2C illustrates a circuit diagram of a part of an electronic device according to another embodiment.

FIG. 2A illustrates a circuit diagram of a part of an electronic device according to an embodiment. FIG. 2B illustrates a circuit diagram of a part of an electronic device according to another embodiment. FIG. 2C illustrates a circuit diagram of a part of an electronic device according to another embodiment. The circuit diagrams illustrated in FIGS. 2A to 2C indicate detailed circuit diagrams of a part 200 of an electronic device illustrated in FIG. 1. The circuit diagrams illustrated in FIGS. 2A to 2C are exemplary, and claims according to embodiments of the disclosure are not limited to the circuit diagrams illustrated in FIGS. 2A to 2C.

In the case where a description is given in order of FIG. 2A, FIG. 2B, and FIG. 2C, the integrated circuit 142 may include a controller 142c and a plurality of transistors LH, LL, RH, and RL. As the controller 142c controls ON states/OFF states of the transistors LH, LL, RH, and RL, a current may flow to the radiator 130. In the specification, the controller 142c may be referred to as a "micro control unit (MCU)", a "state machine", or the like. A transistor may be referred to as a "switch".

The transistors LH, LL, RH, and RL may repeat ON/OFF operations under control of the controller 142c. Some LH and RH of the transistors LH, LL, RH, and RL may be connected with the battery 120, and some LL and RL of the transistors LH, LL, RH, and RL may be connected with the ground layer 140g of the printed circuit board 140. In the specification, the upper left transistor LH and the lower right transistor RL may be referred to as "first group transistors". The upper right transistor RH and the lower left transistor LL may be referred to as "second group transistors".

When a specified condition is satisfied (e.g., in the case where the user wants to make a payment), the controller 142c may turn on the upper left transistor LH and the lower right transistor RL. Because the upper left transistor LH and the lower right transistor RL are in an ON state, a first current may flow along a first path (①). For example, the first current may flow from the input terminal 142i of the integrated circuit 142 to the radiator 130, a second capacitive element 210 (or a resonance capacitor), the lower right transistor RL, and the ground layer 140g.

Next, as illustrated in FIG. 2B, the controller 142c may turn off the upper left transistor LH and may turn on the lower left transistor LL. In this case, the controller 142c may maintain the ON state of the lower right transistor RL during a given time. Because the lower left transistor LL and the lower right transistor RL are in the ON state, a free wheeling current may flow along a second path (②). For example, the free wheeling current may flow from the ground layer 140g to the lower left transistor LL, the radiator 130, the second capacitive element 210, the lower right transistor RL, and the ground layer 140g.

Next, as illustrated in FIG. 2C, the controller 142c may turn on the upper right transistor RH and may turn off the lower right transistor RL. In this case, the controller 142c may maintain the ON state of the lower left transistor LL during the given time. Because the upper right transistor RH and the lower left transistor LL are in the ON state, a second current may flow along a third path (③). For example, the second current may flow from the input terminal 142i of the integrated circuit 142 to the upper right transistor RH, the second capacitive element 210, the radiator 130, the lower left transistor LL, and the ground layer 140g.

As the controller 142c repeats the above-described process, the controller 142c may allow the first current and the second current to repeatedly flow to the radiator 130. The radiator 130 may transmit/receive a signal in a specified frequency band based on the first current and the second current, and the electronic device 100 may make a payment or may wirelessly charge the battery 120.

As described above, according to an embodiment of the disclosure, it may be possible to prevent (or reduce) a free wheeling current from flowing backward toward the battery 120 in the process where the controller 142c allows the first current and the second current to flow to the radiator 130. As such, the battery 120 may supply a stable voltage to the integrated circuit 142, and it may be possible to reduce a capacity (and/or the number) of the first capacitive element 141 for maintaining a voltage of the integrated circuit input terminal 142i.

Figure 3:
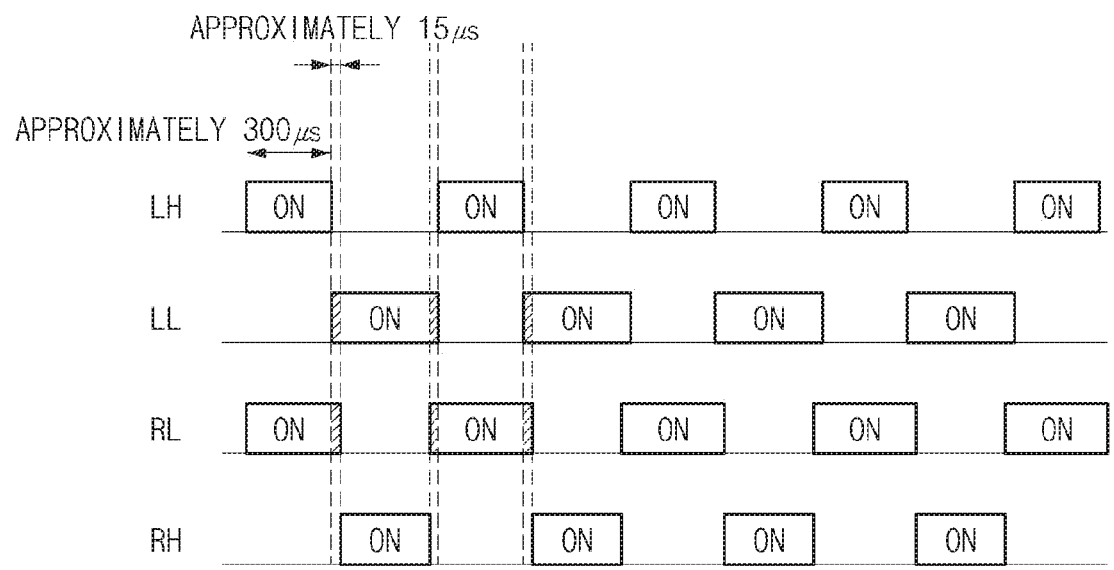
FIG. 3 illustrates a timing diagram of an integrated circuit according to an embodiment.

FIG. 3 illustrates a timing diagram of an integrated circuit according to an embodiment. FIG. 3 illustrates an operation timing of the integrated circuit 142 illustrated in FIGS. 2A, 2B, and 2C. In FIG. 3, a high level may indicate that a transistor is in the ON state as a voltage of a threshold voltage or higher is applied to a gate terminal of the transistor. A low level may indicate that a transistor is in an OFF state.

Referring to FIG. 3, the controller 142c may turn on the upper left transistor LH and the lower right transistor RL. Because the upper left transistor LH and the lower right transistor RL are in the ON state, the first current may flow along the first path (①). A time when the upper left transistor LH and the lower right transistor RL are in the ON state may be, for example, approximately 300 μs.

Next, the controller 142c may turn off the upper left transistor LH and may turn on the lower left transistor LL. In this case, the controller 142c may maintain the ON state of the lower right transistor RL during the given time. The given time may be, for example, approximately 0 as to approximately 15 μs. In other words, the controller 142c may allow a free wheeling current to flow to the ground layer 140g during a time (approximately 0 μs to approximately 15 μs) that is relatively very short compared to a time (approximately 300 μs) when the first current flows.

Then, the controller 142c may turn on the upper right transistor RH and may turn off the lower right transistor RL. In this case, the controller 142c may maintain the ON state of the lower left transistor LL during a given time. Because the upper right transistor RH and the lower left transistor LL are in the ON state, the second current may flow along the third path (③). A time when the upper right transistor RH and the lower left transistor LL are in the ON state may be, for example, approximately 300 μs. In other words, like the first current, the second current may flow through the radiator 130 during approximately 300 μs.

According to an embodiment of the disclosure, the controller 142c may allow the second current to flow to the radiator 130 and may then again allow the first current to flow through the radiator 130. For example, in a state where the upper right transistor RH and the lower left transistor LL are turned on, the controller 142c may turn off the upper right transistor RH and may turn on the lower right transistor RL. In this case, the controller 142c may maintain the ON state of the lower left transistor LL during the given time. That is, because the lower right transistor RL is turned on in a state where the lower left transistor LL is in the ON state, the free wheeling current may flow through the ground layer 140g, the lower right transistor RL, the second capacitive element 210, the radiator 130, the lower left transistor LL, and the ground layer 140g. A time when the free wheeling current flows along the path may be, for example, approximately 0 μs to approximately 15 μs.

Next, the controller 142c may turn on the upper left transistor LH and may turn off the lower left transistor LL. In this case, the controller 142c may maintain the ON state of the lower right transistor RL during the given time. Because the upper left transistor LH and the lower right transistor RL are in the ON state, the first current may again flow along the first path (①).

As the controller 142c repeats the above-described process, the controller 142c may allow the first current and the second current to repeatedly flow to the radiator 130. The radiator 130 may transmit/receive a signal in a specified frequency band based on the first current and the second current, and the electronic device 100 may make a payment or may wirelessly charge the battery 120.

As described above, according to an embodiment of the disclosure, it may be possible to prevent (or reduce) a free wheeling current from flowing backward toward the battery 120 in the process where the controller 142c allows the first current and the second current to flow to the radiator 130. As such, the battery 120 may supply a stable voltage to the integrated circuit 142, and it may be possible to reduce a capacity (and/or the number) of the first capacitive element 141 for maintaining a voltage of the integrated circuit input terminal 142i.

The operation timing described above is exemplary and may be changed depending on a frequency of a signal to be transmitted/received through the radiator 130. For example, as a frequency band of a signal to be transmitted/received through the radiator 130 is changed, timings to turn on/off the transistors LH, LL, RH, and RL and times when ON/OFF states are maintained may vary. Claims according to embodiments of the disclosure are not limited to the operation timing illustrated in FIG. 3.

Figure 4A:
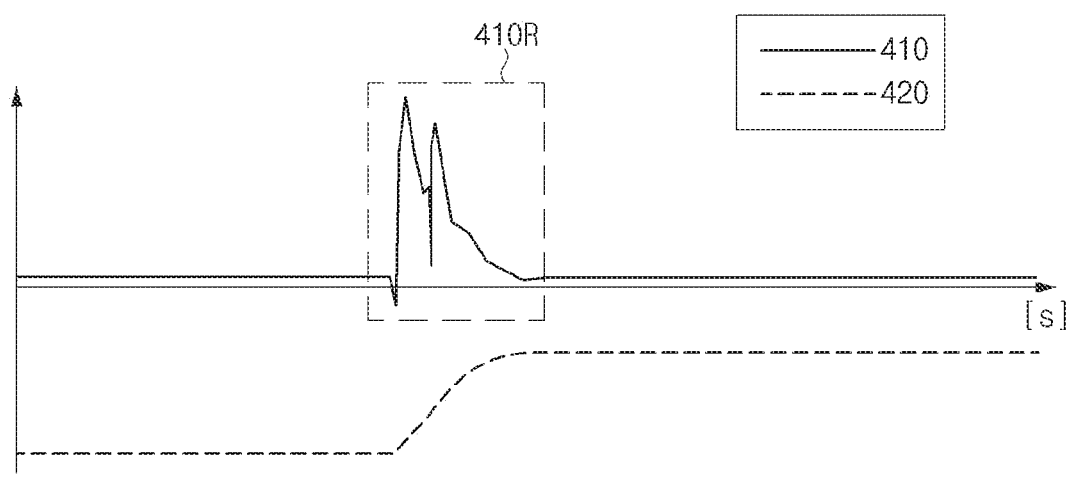
FIG. 4A illustrates a voltage of an input terminal and a current flowing to a radiator, according to a comparative example.
Figure 4B:
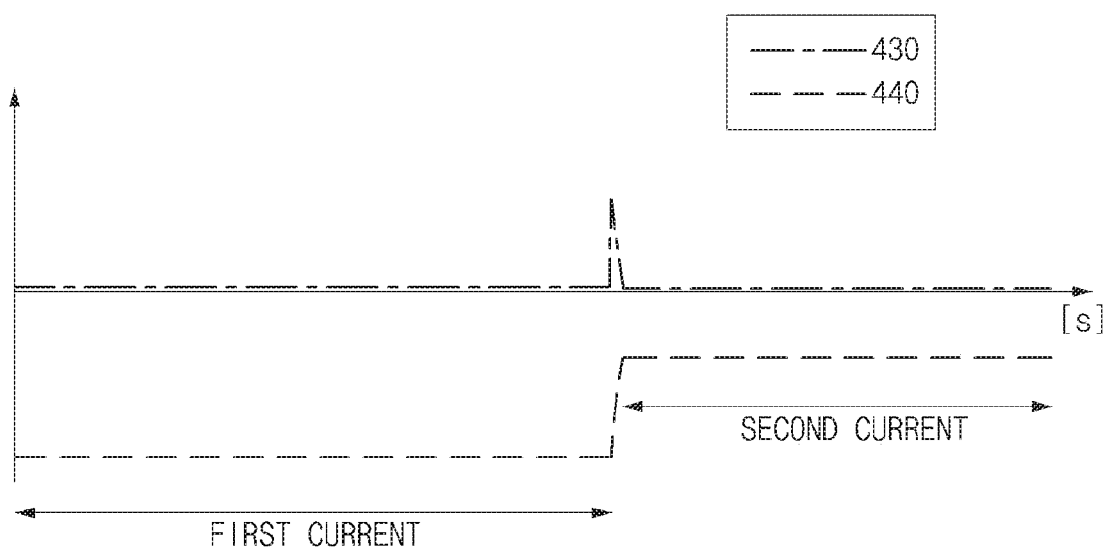
FIG. 4B illustrates a voltage of an input terminal and a current flowing to a radiator, according to an embodiments of the disclosure.

FIG. 4A illustrates a voltage of an input terminal and a current flowing to a radiator, according to a comparative example. FIG. 4B illustrates a voltage of an input terminal and a current flowing to a radiator, according to an embodiments of the disclosure.

In FIG. 4A, graph 410 indicates a voltage of an integrated circuit input terminal according to the comparative example, and graph 420 indicates a current flowing to a radiator according to the comparative example. Referring to FIG. 4A, an integrated circuit according to the comparative example may apply currents of different directions to the radiator. In this case, because the integrated circuit according to the comparative example fails to allow a free wheeling current to flow to a ground layer, a voltage of the integrated circuit input terminal may be unstable. For example, a ripple voltage 410R may occur at the integrated circuit input terminal. Accordingly, according to the comparative example, a battery fails to supply a stable voltage to the integrated circuit. Also, a capacity and/or the number of a capacitive element may be increased to maintain a voltage of the integrated circuit input terminal, thereby causing an increase in a volume and manufacturing costs of an electronic device.

Graph 430 illustrated in FIG. 4B indicates a voltage of the integrated circuit input terminal 142i described with reference to FIGS. 1 to 3, and graph 440 indicates a current flowing to the radiator 130. Referring to graph 430 and graph 440 illustrated in FIG. 4B, because the integrated circuit 142 may allow a free wheeling current to flow to the ground layer 140g in the process of supplying the first current and the second current to the radiator 130, a ripple voltage may not occur. As such, it may be possible to prevent a free wheeling current from flowing backward to the battery 120 or to reduce the free wheeling current, and it may be possible to maintain a voltage of the integrated circuit input terminal 142i at a given level without a capacitive element of a large capacity. Also, according to an embodiment of the disclosure, a capacity (and/or the number) of a capacitive element may decrease, thus reducing a volume and manufacturing costs of the electronic device 100.

The electronic device 100 according to an embodiment of the disclosure may include a loop antenna 130, a printed circuit board 140 including a power wire and a ground wire 140g, a first switch LH electrically connected between a first terminal of the loop antenna 130 and the power wire, a second switch LL electrically connected between the first terminal and the ground wire 140g, a third switch RH electrically connected between a second terminal of the loop antenna 130 and the power wire, a fourth switch RL electrically connected between the second terminal and the ground wire 140g, and a controller 142c. The controller 142c may be configured to electrically connect the power wire and the first terminal through the first switch LH and electrically connect the ground wire 140g and the second terminal through the fourth switch RL, such that a power is supplied to the loop antenna 130, to turn off the first switch LH electrically connected between the power wire and the first terminal and connect the first terminal and the ground wire 140g through the second switch LL, with the fourth switch RL turned on, such that at least a portion of the supplied power to the loop antenna 130 is discharged, and to turn off the fourth switch RL electrically connected between the second terminal and the ground wire 140g and electrically connect the power wire and the second terminal through the third switch RH, with the second switch LL turned on, such that a power is supplied to the loop antenna 130.

According to an embodiment of the disclosure, the loop antenna 130 may be configured to radiate a signal in a specified frequency band based on the supplied power.

According to an embodiment of the disclosure, the first switch LH, the second switch LL, the third switch RH, the fourth switch RL, and the controller 142c may be included in an integrated circuit 142.

According to an embodiment of the disclosure, the first switch LH, the second switch LL, the third switch RH, the fourth switch RL, and the controller 142c may be disposed on the printed circuit board 140.

According to an embodiment of the disclosure, the controller 142c may be configured to electrically connect the power wire and the first terminal through the first switch LH and electrically connect the second terminal and the ground wire 140g through the fourth switch RL, such that a power in a first direction is supplied to the loop antenna 130.

According to an embodiment of the disclosure, the controller 142c may be configured to turn off the first switch LH electrically connected between the power wire and the first terminal and connect the first terminal and the ground wire 140g through the second switch LL, with the fourth switch RL turned on, such that the power in the first direction is discharged.

According to an embodiment of the disclosure, the controller 142c may be configured to turn off the fourth switch RL electrically connected between the second terminal and the ground wire 140g and electrically connect the power wire and the second terminal through the third switch RH, with the second switch LL turned on, such that a power in a second direction opposite to the first direction is supplied to the loop antenna 130.

According to an embodiment of the disclosure, the controller 142c may be configured to turn off the third switch RH electrically connected between the power wire and the second terminal and connect the second terminal and the ground wire 140g through the fourth switch RL, with the second switch LL turned on, such that the power in the second direction is discharged.

According to an embodiment of the disclosure, the controller 142c may be configured to electrically connect the power wire and the first terminal through the first switch LH and electrically connect the second terminal and the ground wire 140g through the fourth switch RL, such that a power is supplied to the loop antenna 130, in response to a user input for making a payment.

According to an embodiment of the disclosure, the electronic device 100 may further include a battery 120 electrically connected with the power wire, and a capacitive element 141, a first terminal of the capacitive element 141 may be connected with the battery 120 and the power wire, and a second terminal of the capacitive element 141 may be connected with the ground wire 140g.

An electronic device 100 according to an embodiment of the disclosure may include a loop antenna 130, a printed circuit board 140 including a power wire and a ground wire 140g, a first switch LH electrically connected between a first terminal of the loop antenna 130 and the power wire, a second switch LL electrically connected between the first terminal and the ground wire 140g, a third switch RH electrically connected between a second terminal of the loop antenna 130 and the power wire, a fourth switch RL electrically connected between the second terminal and the ground wire 140g, a controller 142c electrically connected with each of the first switch LH, the second switch LL, the third switch RH, and the fourth switch RL, and a processor 143 electrically connected with the controller 142c, the processor 143 may transmit, to the controller 142c, a signal for controlling the controller 142c in response to a user input for making a payment, and based on the signal, the controller 142c may be configured to electrically connect the power wire and the first terminal through the first switch HL and electrically connect the second terminal and the ground wire 140g through the fourth switch RL, to turn off the first switch LH electrically connected between the power wire and the first terminal and connect the first terminal and the ground wire 140g through the second switch LL, with the fourth switch RL turned on, and to turn off the fourth switch RL electrically connected between the second terminal and the ground wire 140g and electrically connect the power wire and the second terminal through the third switch RH, with the second switch LL turned on.

According to an embodiment of the disclosure, the controller 142c may supply a power in a first direction to the loop antenna 130 based on an electrical path formed by the first switch LH and the fourth switch RL.

According to an embodiment of the disclosure, the controller 142c may discharge the power in the first direction based on an electrical path formed by the second switch LL and the fourth switch RL.

According to an embodiment of the disclosure, the controller 142c may supply a power in a second direction to the loop antenna 130 based on an electrical path formed by the third switch RH and the second switch LL.

According to an embodiment of the disclosure, the loop antenna 130 may be configured to radiate a signal in a specified frequency band based on the power in the first direction and the power in the second direction.

An electronic device 100 according to an embodiment of the disclosure may include a loop antenna 130, a printed circuit board 140 including a power wire and a ground wire 140g, a first switch LH connected between a first terminal of the loop antenna 130 and the power wire, a second switch LL connected between the first terminal and the ground wire 140g, a third switch RH connected between a second terminal of the loop antenna 130 and the power wire, a fourth switch RL connected between the second terminal and the ground wire 140g, and a controller 142c electrically connected with the first switch LH, the second switch LL, the third switch RH, and the fourth switch RL, and the controller may be configured to supply a power in a first direction to the loop antenna 130 based on a first electrical path formed by the first switch LH and the fourth switch, when a specified condition is satisfied, to discharge the power in the first direction based on a second electrical path formed by the second switch LL and the fourth switch RL, and to supply a power in a second direction to the loop antenna 130 based on a third electrical path formed by the third switch RH and the second switch LL.

According to an embodiment of the disclosure, the controller 142c may be configured to discharge the power in the second direction based on a fourth electrical path formed by the fourth switch RL and the second switch LL.

According to an embodiment of the disclosure, the loop antenna 130 may be configured to radiate a signal in a specified frequency band based on the power in the first direction and the power in the second direction.

According to an embodiment of the disclosure, the electronic device 100 may further include a battery 120 electrically connected with the power wire, and the power in the first direction and the power in the second direction are supplied from the battery 120 to the loop antenna 130.

According to an embodiment of the disclosure, the electronic device 100 may further include a processor 143 electrically connected with the controller 142c, and the processor 143 may transmit, to the controller 142c, a signal for controlling the controller 142c in response to a user input for making a payment.

An electronic device 100 according to an embodiment of the disclosure may include a battery 120, a printed circuit board 140 surrounding the battery 120 and including a ground layer 140g, a radiator 130 disposed under or on the printed circuit board 140 or formed at the printed circuit board 140, an integrated circuit 142 disposed on the printed circuit board 140 and electrically connected with the battery 120, the ground layer 140g, and the radiator 130, and at least one processor 143 disposed on the printed circuit board 140 and electrically connected with the integrated circuit 142, and the at least one processor 143 may be configured to allow the integrated circuit 142 to apply a first current flowing from the battery 120 to the radiator 130 to the radiator 130, when a specified condition is satisfied, to turn on at least a portion of the integrated circuit 142 such that a second current flowing to the radiator 130 from a first point, which is connected with the ground layer 140g, of the integrated circuit 142 flows to a second point, which is connected with the ground layer 140g, of the integrated circuit 142, to allow the integrated circuit 142 to apply a third current flowing in an opposite direction to the first current to the radiator 130, and to transmit/receive a signal in a specified frequency band based on the first current and the third current.

According to an embodiment of the disclosure, the integrated circuit 142 may include a first transistor LH having one end connected with the battery 120 and an opposite end connected with one end of the radiator 130, a second transistor LL having one end connected with the opposite end of the first transistor LH and an opposite end connected with the first point, a third transistor RH having one end connected with the battery 120 and an opposite end connected with an opposite end of the radiator 130, and a fourth transistor RL having one end connected with the opposite end of the third transistor RH and an opposite end connected with the second point.

According to an embodiment of the disclosure, the at least one processor 143 may be configured to turn on the second transistor LL and the fourth transistor RL such that the second current flows to the first point, the second transistor LL, the radiator 130, the fourth transistor RL, and the second point.

According to an embodiment of the disclosure, the at least one processor 143 may be configured to turn off the first transistor LH and the third transistor RH while the second current flows.

According to an embodiment of the disclosure, the at least one processor 143 may be configured to turn on the first transistor LH and the fourth transistor RL such that the first current flows to the first transistor LH, the radiator 130, the fourth transistor RL, and the second point.

According to an embodiment of the disclosure, the at least one processor 143 may be configured to turn off the second transistor LL and the third transistor RH while the first current flows.

According to an embodiment of the disclosure, the at least one processor 143 may be configured to turn on the second transistor LL and the third transistor RH such that the third current flows to the third transistor RH, the radiator 130, the second transistor LL, and the first point.

According to an embodiment of the disclosure, the at least one processor 143 may be configured to turn off the first transistor LH and the fourth transistor RL while the third current flows.

According to an embodiment of the disclosure, the integrated circuit 142 may further include a controller 142c that controls ON/OFF of the first transistor LH, the second transistor LL, the third transistor RH, and the fourth transistor RL based on a control signal received from the at least one processor 143.

According to an embodiment of the disclosure, the controller 142c may include at least one of a micro control unit and a state machine.

According to an embodiment of the disclosure, the electronic device 100 may further include a capacitive element 141 having one end connected with each of the battery 120 and the integrated circuit 142 and an opposite end connected with the ground layer 140g.

According to an embodiment of the disclosure, the at least one processor 143 may be configured to allow the integrated circuit 142 to apply a first current flowing from the battery 120 to the radiator 130 to the radiator 130 in response to a user input for making a payment.

According to an embodiment of the disclosure, the at least one processor 143 may include at least one of an application processor 143 and a communication processor 143.

According to an embodiment of the disclosure, the specified frequency band may correspond to a frequency band for magnetic secure transmission.

According to an embodiment of the disclosure, the electronic device 100 may further include a cover glass and a back cover facing away from the cover glass and including an opening formed at a specified area thereof, and the radiator 130 may correspond to a coil-type radiator 130 that is interposed between the cover glass and the back cover and surrounding the opening.

According to an embodiment of the disclosure, an integrated circuit 142 feeding a radiator 130 may include a plurality of transistors each electrically connected with the radiator 130, at least a part of the plurality of transistors being electrically connected with a ground part 140g, and a controller 142c. The controller 142c may allow the radiator 130 to transmit/receive a signal in a specified frequency band, when a specified condition is satisfied, by turning on first group transistors LH and RL disposed on a first path such that a first current is applied to the radiator 130 and turning on second group transistors RH and LL disposed on a second path such that a second current flowing in an opposite direction to the first current is applied to the radiator 130. The controller 142c may be configured to turn on at least a part connected with the ground part 140g from among the first group transistors LH and RL and the second ground transistors RH and LL such that a third current flows to the ground part 140g, before the second current is applied to the radiator 130.

According to an embodiment of the disclosure, the first group transistors LH and RL may include a first transistor having one end connected with an external battery 120 and an opposite end connected with one end of the radiator 130 and a second transistor RL having one end connected with an opposite end of the radiator 130 and an opposite end connected with the ground part 140g, and the second group transistors RH and LL may include a third transistor RH having one end connected with the external battery 120 and an opposite end connected with an opposite end of the radiator 130 and a fourth transistor LL having one end connected with the one end of the radiator 130 and an opposite end connected with the ground part 140g.

According to an embodiment of the disclosure, the controller 142c may be configured to turn on the fourth transistor LL and the second transistor RL such that the third current flows to the fourth transistor LL, the radiator 130, the second transistor RL, and the ground part 140g.

According to an embodiment of the disclosure, the controller 142c may be configured to turn on the first group transistors LH and RL such that the first current flows to the first transistor LH, the radiator 130, the second transistor RL, and the ground part 140g.

According to an embodiment of the disclosure, the controller 142c may be configured to turn on the second group transistors RH and LL such that the second current flows to the third transistor RH, the radiator 130, the fourth transistor LL, and the ground part 140g.

Figure 5:
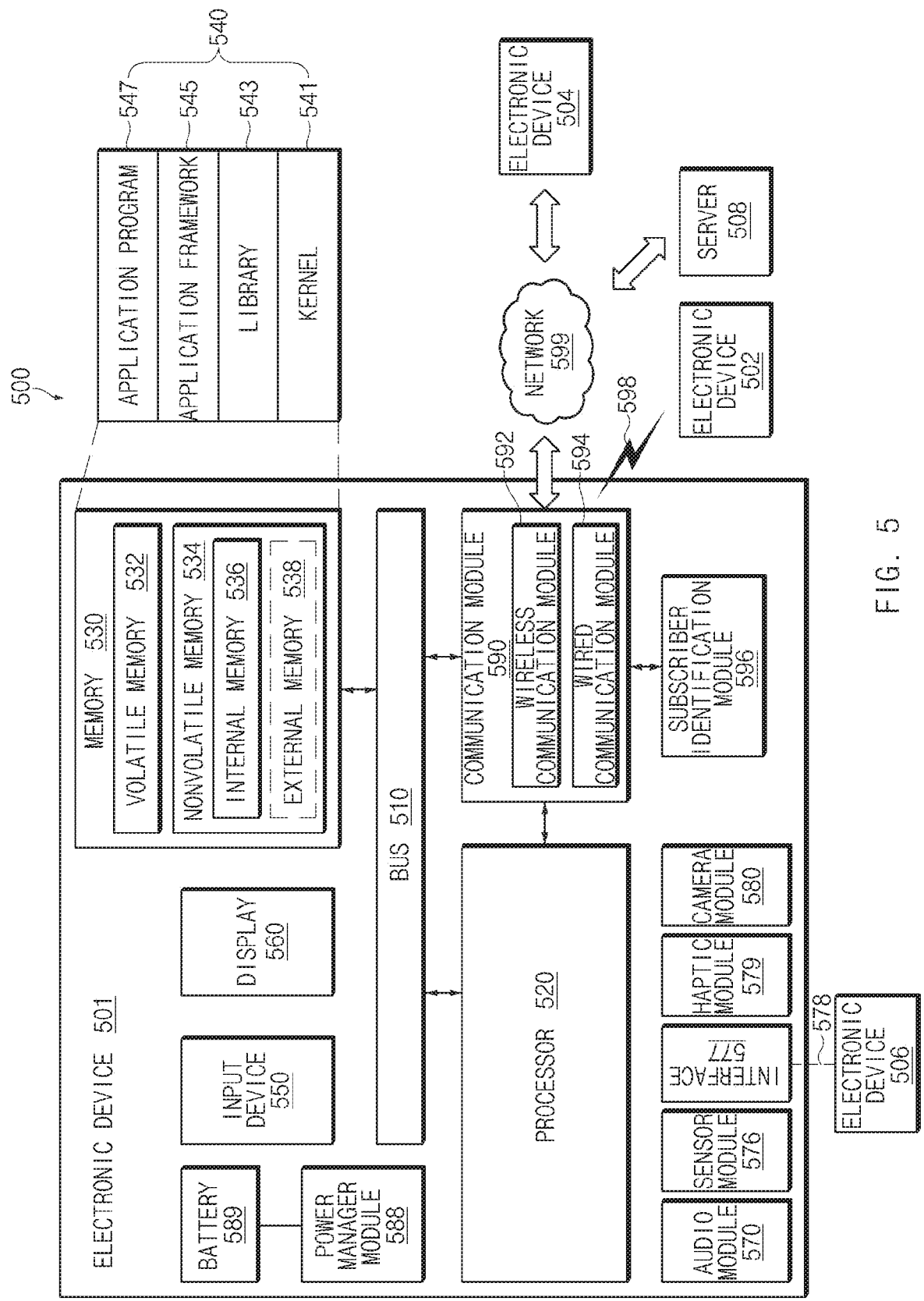
FIG. 5 is a block diagram of an electronic device in a network environment, according to various embodiments.

FIG. 5 is a block diagram of an electronic device in a network environment according to various embodiments.

Referring to FIG. 5, an electronic device 501 (e.g., the electronic device 100 of FIG. 1) may communicate with an electronic device 502 through a first network 598 (e.g., a short-range wireless communication) or may communicate with an electronic device 504 or a server 508 through a second network 599 (e.g., a long-distance wireless communication) in a network environment 500. According to an embodiment, the electronic device 501 may communicate with the electronic device 504 through the server 508. According to an embodiment, the electronic device 501 may include a processor 520, a memory 530, an input device 550, a sound output device 555, a display device 560, an audio module 570, a sensor module 576, an interface 577, a haptic module 579, a camera module 580, a power management module 588, a battery 589, a communication module 590, a subscriber identification module 596, and an antenna module 597. According to some embodiments, at least one (e.g., the display device 560 or the camera module 580) among components of the electronic device 501 may be omitted or other components may be added to the electronic device 501. According to some embodiments, some components may be integrated and implemented as in the case of the sensor module 576 (e.g., a fingerprint sensor, an iris sensor, or an illuminance sensor) embedded in the display device 560 (e.g., a display).

The processor 520 may operate, for example, software (e.g., a program 540) to control at least one of other components (e.g., a hardware or software component) of the electronic device 501 connected to the processor 520 and may process and compute a variety of data. The processor 520 may load a command set or data, which is received from other components (e.g., the sensor module 576 or the communication module 590), into a volatile memory 532, may process the loaded command or data, and may store result data into a nonvolatile memory 534. According to an embodiment, the processor 520 may include a main processor 521 (e.g., a central processing unit or an application processor) and an auxiliary processor 523 (e.g., a graphic processing device, an image signal processor, a sensor hub processor, or a communication processor), which operates independently from the main processor 521, additionally or alternatively uses less power than the main processor 521, or is specified to a designated function. In this case, the auxiliary processor 523 may operate separately from the main processor 521 or embedded.

In this case, the auxiliary processor 523 may control, for example, at least some of functions or states associated with at least one component (e.g., the display device 560, the sensor module 576, or the communication module 590) among the components of the electronic device 501 instead of the main processor 521 while the main processor 521 is in an inactive (e.g., sleep) state or together with the main processor 521 while the main processor 521 is in an active (e.g., an application execution) state. According to an embodiment, the auxiliary processor 523 (e.g., the image signal processor or the communication processor) may be implemented as a part of another component (e.g., the camera module 580 or the communication module 590) that is functionally related to the auxiliary processor 523. The memory 530 may store a variety of data used by at least one component (e.g., the processor 520 or the sensor module 576) of the electronic device 501, for example, software (e.g., the program 540) and input data or output data with respect to commands associated with the software. The memory 530 may include the volatile memory 532 or the nonvolatile memory 534.

The program 540 may be stored in the memory 530 as software and may include, for example, an operating system 542, a middleware 544, or an application 546.

The input device 550 may be a device for receiving a command or data, which is used for a component (e.g., the processor 520) of the electronic device 501, from an outside (e.g., a user) of the electronic device 501 and may include, for example, a microphone, a mouse, or a keyboard.

The sound output device 555 may be a device for outputting a sound signal to the outside of the electronic device 501 and may include, for example, a speaker used for general purposes, such as multimedia play or recordings play, and a receiver used only for receiving calls. According to an embodiment, the receiver and the speaker may be either integrally or separately implemented.

The display device 560 may be a device for visually presenting information to the user and may include, for example, a display, a hologram device, or a projector and a control circuit for controlling a corresponding device. According to an embodiment, the display device 560 may include a touch circuitry or a pressure sensor for measuring an intensity of pressure on the touch.

The audio module 570 may convert a sound and an electrical signal in dual directions. According to an embodiment, the audio module 570 may obtain the sound through the input device 550 or may output the sound through an external electronic device (e.g., the electronic device 502 (e.g., a speaker or a headphone)) wired or wirelessly connected to the sound output device 555 or the electronic device 501.

The sensor module 576 may generate an electrical signal or a data value corresponding to an operating state (e.g., power or temperature) inside or an environmental state outside the electronic device 501. The sensor module 576 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 577 may support a designated protocol wired or wirelessly connected to the external electronic device (e.g., the electronic device 502). According to an embodiment, the interface 577 may include, for example, an HDMI (high-definition multimedia interface), a USB (universal serial bus) interface, an SD card interface, or an audio interface.

A connecting terminal 578 may include a connector that physically connects the electronic device 501 to the external electronic device (e.g., the electronic device 502), for example, an HDMI connector, a USB connector, an SD card connector, or an audio connector (e.g., a headphone connector).

The haptic module 579 may convert an electrical signal to a mechanical stimulation (e.g., vibration or movement) or an electrical stimulation perceived by the user through tactile or kinesthetic sensations. The haptic module 579 may include, for example, a motor, a piezoelectric element, or an electric stimulator.

The camera module 580 may shoot a still image or a video image. According to an embodiment, the camera module 580 may include, for example, at least one lens, an image sensor, an image signal processor, or a flash.

The power management module 588 may be a module for managing power supplied to the electronic device 501 and may serve as at least a part of a power management integrated circuit (PMIC).

The battery 589 may be a device for supplying power to at least one component of the electronic device 501 and may include, for example, a non-rechargeable (primary) battery, a rechargeable (secondary) battery, or a fuel cell.

The communication module 590 may establish a wired or wireless communication channel between the electronic device 501 and the external electronic device (e.g., the electronic device 502, the electronic device 504, or the server 508) and support communication execution through the established communication channel. The communication module 590 may include at least one communication processor operating independently from the processor 520 (e.g., the application processor) and supporting the wired communication or the wireless communication. According to an embodiment, the communication module 590 may include a wireless communication module 592 (e.g., a cellular communication module, a short-range wireless communication module, or a GNSS (global navigation satellite system) communication module) or a wired communication module 594 (e.g., an LAN (local area network) communication module or a power line communication module) and may communicate with the external electronic device using a corresponding communication module among them through the first network 598 (e.g., the short-range communication network such as a Bluetooth, a WiFi direct, or an IrDA (infrared data association)) or the second network 599 (e.g., the long-distance wireless communication network such as a cellular network, an internet, or a computer network (e.g., LAN or WAN)). The above-mentioned various communication modules 590 may be implemented into one chip or into separate chips, respectively.

According to an embodiment, the wireless communication module 592 may identify and authenticate the electronic device 501 using user information stored in the subscriber identification module 596 in the communication network.

The antenna module 597 may include one or more antennas to transmit or receive the signal or power to or from an external source. According to an embodiment, the communication module 590 (e.g., the wireless communication module 592) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 501 and the external electronic device 504 through the server 508 connected to the second network 599. Each of the electronic devices 502 and 504 may be the same or different types as or from the electronic device 501. According to an embodiment, all or some of the operations performed by the electronic device 501 may be performed by another electronic device or a plurality of external electronic devices. When the electronic device 501 performs some functions or services automatically or by request, the electronic device 501 may request the external electronic device to perform at least some of the functions related to the functions or services, in addition to or instead of performing the functions or services by itself. The external electronic device receiving the request may carry out the requested function or the additional function and transmit the result to the electronic device 501. The electronic device 501 may provide the requested functions or services based on the received result as is or after additionally processing the received result. To this end, for example, a cloud computing, distributed computing, or client-server computing technology may be used.

Figure 6:
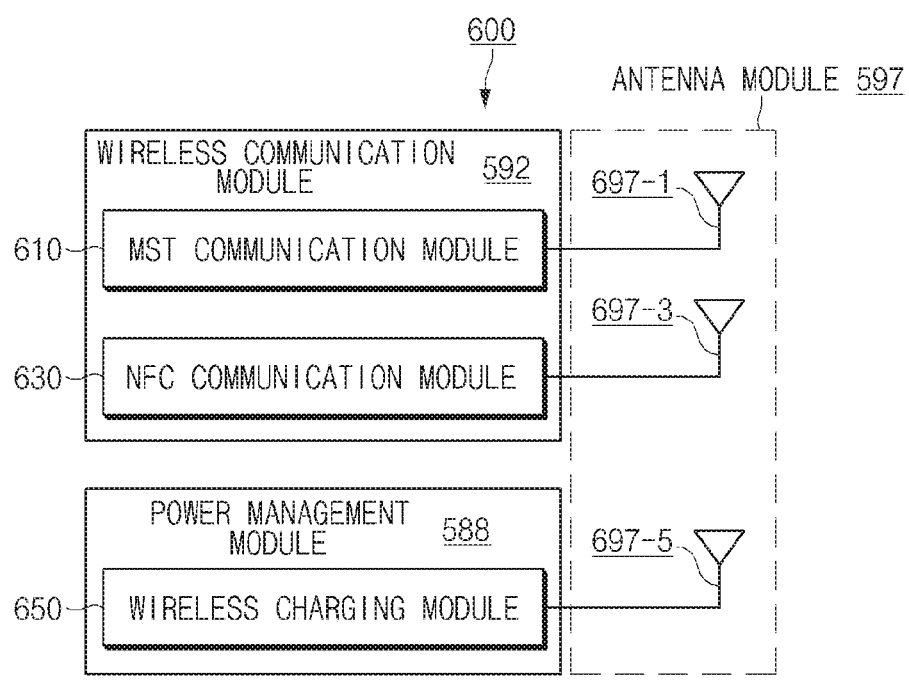
FIG. 6 is a block diagram illustrating a wireless communication module, a power management module, and an antenna module of an electronic device, according to various embodiments.

FIG. 6 is a block diagram illustrating a wireless communication module, a power management module, and an antenna module of an electronic device, according to various embodiments.

Referring to FIG. 6, the wireless communication module 592 may include an MST communication module 610 or an NFC communication module 630, and the power management module 588 may include a wireless charging module 650. In this case, an antenna module 697 may separately include a plurality of antennas that include an MST antenna 697-1 connected with the MST communication module 610, an NFC antenna 697-3 connected with the NFC communication module 630, and a wireless charging antenna 697-5 connected with the wireless charging module 650. For convenience of description, additional description associated with components that are identical to the components of FIG. 5 will be omitted to avoid redundancy or will be briefly described.

The MST communication module 610 may receive a signal (e.g., a signal including control information or payment information) from the processor 520, may generate a magnetic signal corresponding to the received signal through the MST antenna 697-1, and may transmit the generated magnetic signal to the external electronic device 502 (e.g., a POS device). According to an embodiment, for example, the MST communication module 610 may include a switching module (not illustrated) including one or more switches connected with the MST antenna 697-1, and may control the switching module to change a direction of a voltage or a current to be supplied to the MST antenna 697-1. This may be transmitted through the MST antenna 697-1, for example, to change a direction of a magnetic signal (e.g., a magnetic field) to be transmitted to the external electronic device 502 through the short-range wireless communication 598. The magnetic signal, which is transmitted with the direction changed, may cause a form and an effect that are similar to those of a magnetic field generated while a magnetic card is swiped on a card reader of the electronic device 502. According to an embodiment, payment-related information and a control signal received from the electronic device 502 in the form of the magnetic signal may be transmitted, for example, to a payment server (e.g., the server 508) through the network 599.

The NFC communication module 630 may obtain a signal (e.g., a signal including control information or payment information) from the processor 520, and may transmit the obtained signal to the external electronic device 502 through the NFC antenna 697-3. According to an embodiment, the NFC communication module 630 may receive a signal (e.g., a signal including control information or payment information) transmitted from the external electronic device 502 through the NFC antenna 697-3.

The wireless charging module 650 may wirelessly transmit a power to the external electronic device 502 (e.g., a mobile phone or a wearable device) through the wireless charging antenna 697-5, or may wirelessly receive a power from the external electronic device 502 (e.g., a wireless charging device). The wireless charging module 650 may support various wireless charging manners, for example, including a magnetic resonance manner or a magnetic induction manner.

According to an embodiment, some antennas of the MST antenna 697-1, the NFC antenna 697-3, or the wireless charging antenna 697-5 may mutually share at least a portion of a radiation part. For example, a radiation part of the MST antenna 697-1 may be used as a radiation part of the NFC antenna 697-3 or the wireless charging antenna 697-5, and vice versa. In the case where the MST antenna 697-1, the NFC antenna 697-3, or the wireless charging antenna 697-5 shares at least a partial area of the radiation part, the antenna module 697 may include a switching circuit (not illustrated) for selectively connecting or separating (e.g., opening) at least a part of the antennas 697-1, 697-3, or 697-5 under control of the wireless communication module 592 (e.g., the MST communication module 610 or the NFC communication module 630) or a power management module (e.g., the wireless charging module 650). For example, in the case where the electronic device 501 uses a wireless charging function, the NFC communication module 630 or the wireless charging module 650 may control the switching circuit such that the at least a partial area of the radiation part shared by the NFC antenna 697-3 and the wireless charging antenna 697-5 is temporarily separated from the NFC antenna 697-3 and is connected only with the wireless charging antenna 697-5.

According to an embodiment, at least some functions of the MST communication module 610, the NFC communication module 630, or the wireless charging module 650 may be controlled by an external processor (e.g., the processor 520). According to an embodiment, specified functions (e.g., a payment function) of the MST communication module 610 or the NFC communication module 630 may be performed in a trusted execution environment (TEE). The trusted execution environment (TEE) according to various embodiments may be, for example, an execution environment in which at least a portion of a specified area of the memory 530 is allocated to perform a function (e.g., a financial transaction or a private information related function) requiring a relatively high level of security and an access to the specified area is separately and restrictively allowed, for example, depending on an access subject or a running application.

The electronic device according to various embodiments disclosed in the disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technologies disclosed in the disclosure to the particular forms disclosed herein; rather, the disclosure should be construed to cover various modifications, equivalents, and/or alternatives of embodiments of the disclosure. With regard to description of drawings, similar components may be assigned with similar reference numerals. As used herein, singular forms may include plural forms as well unless the context clearly indicates otherwise. In the disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the disclosure may be implemented by software (e.g., the program 540) including an instruction stored in a machine-readable storage media (e.g., an internal memory 536 or an external memory 538) readable by a machine (e.g., a computer). The machine may be a device that calls the instruction from the machine-readable storage media and operates depending on the called instruction and may include the electronic device (e.g., the electronic device 501). When the instruction is executed by the processor (e.g., the processor 520), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the disclosure may be executed sequentially, in parallel, repeatedly, or in a heuristic method. Also, at least some operations may be executed in different sequences, omitted, or other operations may be added.

The invention claimed is:

1. An electronic device comprising:
a loop antenna;
a printed circuit board including a power wire and a ground wire;
a first switch electrically connected between a first terminal of the loop antenna and the power wire;
a second switch electrically connected between the first terminal and the ground wire;
a third switch electrically connected between a second terminal of the loop antenna and the power wire;
a fourth switch electrically connected between the second terminal and the ground wire; and
a controller, wherein the controller is configured to:
electrically connect the power wire and the first terminal through the first switch and electrically connect the ground wire and the second terminal through the fourth switch to supply a power to the loop antenna;
turn off the first switch electrically connected between the power wire and the first terminal and connect the first terminal and the ground wire through the second switch, with the fourth switch turned on, wherein at least a portion of the supplied power to the loop antenna is discharged; and
turn off the fourth switch electrically connected between the second terminal and the ground wire and electrically connect the power wire and the second terminal through the third switch, with the second switch turned on to supply a power to the loop antenna.

2. The electronic device of claim 1, wherein the loop antenna is configured to:
radiate a signal in a specified frequency band based on the supplied power.

3. The electronic device of claim 1, wherein the first switch, the second switch, the third switch, the fourth switch, and the controller are included in an integrated circuit.

4. The electronic device of claim 1, wherein the first switch, the second switch, the third switch, the fourth switch, and the controller are disposed on the printed circuit board.

5. The electronic device of claim 1, wherein the controller is configured to:
electrically connect the power wire and the first terminal through the first switch and electrically connect the second terminal and the ground wire through the fourth switch, such that a power in a first direction is supplied to the loop antenna.

6. The electronic device of claim 5, wherein the controller is configured to:
turn off the first switch electrically connected between the power wire and the first terminal and connect the first terminal and the ground wire through the second switch, with the fourth switch turned on, such that the power in the first direction is discharged.

7. The electronic device of claim 6, wherein the controller is configured to:
turn off the fourth switch electrically connected between the second terminal and the ground wire and electrically connect the power wire and the second terminal through the third switch, with the second switch turned on, such that a power in a second direction opposite to the first direction is supplied to the loop antenna.

8. The electronic device of claim 7, wherein the controller is configured to:
turn off the third switch electrically connected between the power wire and the second terminal and connect the second terminal and the ground wire through the fourth switch, with the second switch turned on, such that the power in the second direction is discharged.

9. The electronic device of claim 1, wherein the controller is configured to:
electrically connect the power wire and the first terminal through the first switch and electrically connect the second terminal and the ground wire through the fourth switch, such that a power is supplied to the loop antenna, in response to a user input for making a payment.

10. The electronic device of claim 1, further comprising:
a battery electrically connected with the power wire; and
a capacitive element,
wherein a first terminal of the capacitive element is connected with the battery and the power wire and a second terminal of the capacitive element is connected with the ground wire.

11. An electronic device comprising:
a loop antenna;
a printed circuit board including a power wire and a ground wire;
a first switch electrically connected between a first terminal of the loop antenna and the power wire;
a second switch electrically connected between the first terminal and the ground wire;

a third switch electrically connected between a second terminal of the loop antenna and the power wire;

a fourth switch electrically connected between the second terminal and the ground wire; and a controller electrically connected with the first switch, the second switch, the third switch, and the fourth switch, and wherein the controller is configured to:

supply a power in a first direction to the loop antenna based on a first electrical path formed by the first switch and the fourth switch, when a specified condition is satisfied;

discharge at least a portion of the supplied power in the first direction based on a second electrical path formed by the second switch and the fourth switch; and supply a power in a second direction to the loop antenna based on a third electrical path formed by the third switch and the second switch.

12. The electronic device of claim 11, wherein the controller is configured to discharge the power in the second direction based on a fourth electrical path formed by the fourth switch and the second switch.

13. The electronic device of claim 11, wherein the loop antenna is configured to radiate a signal in a specified frequency band based on the power in the first direction and the power in the second direction.

14. The electronic device of claim 11, further comprising:
a battery electrically connected with the power wire,
wherein the power in the first direction and the power in the second direction are supplied from the battery to the loop antenna.

15. The electronic device of claim 11, further comprising:
a processor electrically connected with the controller,
wherein the processor transmits, to the controller, a signal for controlling the controller in response to a user input for making a payment.

* * * * *